United States Patent [19]

Hieda et al.

[11] Patent Number: 4,942,459
[45] Date of Patent: Jul. 17, 1990

[54] COLOR TEMPERATURE DETECTING DEVICE FOR PRODUCING A COLOR TEMPERATURE SIGNAL DEVELOPED USING THE RATIO BETWEEN COLOR COMPONENT SIGNALS

[75] Inventors: Teruo Hieda; Hiroyuki Shimizu; Kazunori Masuda, all of Kanagawa, Japan

[73] Assignee: Canon Kabushiki Kaisha, Tokyo, Japan

[21] Appl. No.: 192,958

[22] Filed: May 12, 1988

[51] Int. Cl.⁵ .......................... H04N 9/097; H04N 9/73
[52] U.S. Cl. ................................. 358/41; 358/29 WD
[58] Field of Search ........................ 358/29 C, 41, 55; 356/406, 416, 419, 425

[56] References Cited

U.S. PATENT DOCUMENTS

4,682,210  7/1987  Ikemura et al. ........................ 358/29
4,739,392  4/1988  Ueda et al. ............................. 358/29

Primary Examiner—James J. Groody
Assistant Examiner—Robert M. Bauer
Attorney, Agent, or Firm—Robin, Blecker, Daley, & Driscoll

[57] ABSTRACT

A color temperature detecting device includes a color component detecting element for detecting electric charges for color components excited by incident light and accumulated with the lapse of time to produce color component signals, a comparison circuit for comparing the color component signals with respective given reference signals to produce discharge time length signals which correspond to the respective accumulated amounts of the electric charges, and an output part for obtaining a ratio between the color components on the basis of the discharge time length signals produced from the comparison circuit to produce a signal according to the ratio as color temperature information.

7 Claims, 10 Drawing Sheets

COLOR TEMPERATURE DETECTING DEVICE FOR PRODUCING A COLOR TEMPERATURE SIGNAL DEVELOPED USING THE RATIO BETWEEN COLOR COMPONENT SIGNALS

BACKGROUND OF THE INVENTION

1. Field of the Invention

This invention relates to a color temperature detecting device suited for the white balance adjustment device of a color TV camera which is arranged to detect the color components of illumination applied to an object and to automatically accomplish white balance adjustment according to the result of detection.

2. Description of the Related Art

White balance adjustment is one of the important signal adjusting actions for a color TV camera. The term "white balance adjustment" means variable adjustment of the gain, etc. of the chrominance signal of an object's image picked up to bring three primary color components (red, green and blue) into the ratio of 1:1:1 relative to a white object. The three primary color component ratio varies with the kind of illumination. Inadequate white balance adjustment makes color reproduction with fidelity impossible as it causes the whole picked up image plane to have a bluish or reddish appearance.

In view of this, a white balance device called an outside-detection automatic follow-up type white balance adjustment device has been contrived for accurately and automatically adjusting the white balance. Devices of this kind has been disclosed in Japanese Patent Applications Laid-Open Nos. SHO 54-53924 and SHO 55-158792, etc. These devices are arranged to detect the ambient light of the object by means of a light receiving system provided separately from an image sensing system and to automatically adjust the white balance on the basis of the result of detection. More specifically, two or three photo sensors, each having a color filter in front of it, are arranged to detect two or three different color components from the ambient light. These color components are logarithmically compressed. After that, differences among them are obtained. Then, ratios among the color components of the ambient light are equivalently detected. The gain of the chrominance signal amplifier of an image pickup (or sensing) system is controlled for white balance adjustment.

However, the conventional device of the above stated kind must be provided with a highly accurate logarithmic compression amplifier for adequately coping with ambient light having a wide ranged illuminance. In addition to that, the conventional device necessitates the use of a correction circuit for correction of temperature, etc.. These requirements thus have resulted in a complex arrangement and increased cost of the device.

SUMMARY OF THE INVENTION

It is an object of this invention to provide a color temperature detecting device which is capable of accurately detecting the color temperature of incident light over a wide illuminance range without necessitating a complex arrangement.

To attain this object, a color temperature detecting device arranged as an embodiment of the invention comprises: color component detecting means for detecting electric charges for color components excited by incident light and accumulated with the lapse of time to produce color component signals; comparison means for comparing the color component signals with respective given reference signals to produce time length signals which are proportional to the respective accumulated amounts of the electric charges; and an output part for obtaining a ratio between the color components on the basis of the time length signals produced from the comparison means to produce signals according to the ratio as color temperature information.

This embodiment is arranged to detect the intensity of each color component of the incident light as the amount of the electric charge excited and accumulated according to the quantity of the light; to obtain a time length signal by detecting the discharge time of the electric charge; and to produce a signal according to the time length signal as color temperature information. Therefore, despite its simple arrangement, the embodiment is capable of detecting the color temperature of incident light having a wide range of illuminance values. Therefore, when applied to the light receiving system of the outside-detection automatic follow-up type white balance adjustment device mentioned in the foregoing, the embodiment permits accurate white balance adjustment without necessitating a complex arrangement.

A color temperature detecting device embodying this invention as another embodiment thereof is arranged to detect the color temperature of incident light by comparing the levels of a plurality of color components of the incident light with reference levels each of which varies with the illuminance of incident light. The embodiment which is arranged in this manner is capable of accurately detecting light over a wide range of illuminance values by lowering the reference level if the intensity of the light is weak or by raising the reference level in the event of light of strong intensity. When applied to the light receiving system of the outside-detection automatic follow-up type white balance adjustment device mentioned in the foregoing, therefore, the embodiment enables the white balance adjustment device to accurately adjust the white balance with a wide dynamic range.

A photo-electric conversion device which is arranged according to this invention as a further embodiment thereof comprises a storage part for accumulating an electric charge which is excited and brought about by incident light; a transmitting part for sending out the accumulated electric charge as a voltage signal; and an illuminance detecting part for detecting an illuminance of the incident light to control the capacity of the storage part. The device which is arranged in this manner is capable of accurately photo-electric converting light of a wide range of illuminance range because: The output voltage of the conversion device becomes inversely proportional to the capacity of the storage part with the capacity of the storage part arranged to be decreased for light of weak intensity and to be increased for light of strong intensity; and the sensitivity of the device thus can be adjusted to the illuminance of the incident light. Therefore, with the above stated outside-detection automatic follow-up type white balance adjustment device provided with this embodiment for its light receiving system, the embodiment enables the white balance adjustment device to accurately adjust the white balance with a wide dynamic range.

BRIEF DESCRIPTION OF THE DRAWINGS

FIGS. 3(A) to 3(I) are wave form charts showing the operation of the device shown in FIG. 1.

FIGS. 7(A) to 7(K) are wave form charts showing the operation of the device shown in FIG. 6.

FIGS. 10(A) to 10(C) show another example of arrangement of the photo-electric converter.

DETAILED DESCRIPTION OF THE PREFERRED EMBODIMENTS

Figure 1:
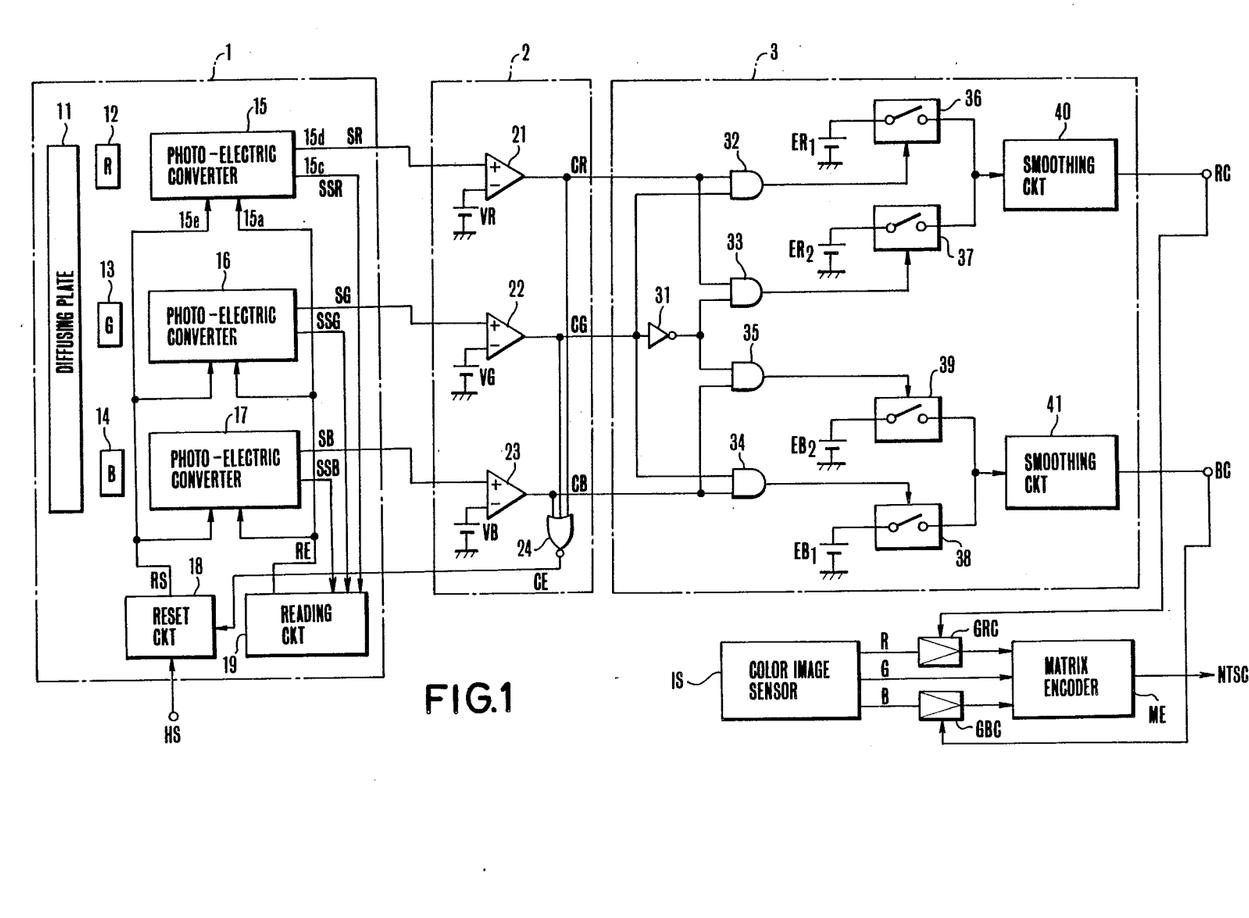
FIG. 1 is a circuit diagram showing a first embodiment of this invention.

FIG. 1 shows in a circuit diagram an image sensing apparatus arranged according to this invention as a first embodiment thereof. Referring to FIG. 1, a color component detection part 1 is arranged as follows: The incident light is divided into three primary color components. The color components are photo-electric converted. Voltages which correspond to the electric charges accumulated by photo-electric converters are produced from these converters as a red component signal SR, a green component signal SG and a blue component signal SB. The color component detection part 1 includes a diffusing plate 11 which is arranged to eliminate any biased state of color information by diffusing the incident light which comes through a light receiving system. The light passing through this diffusing plate 11 comes to color filters 12, 13 and 14 which are for red (R), green (G) and blue (B). The color components are taken out through these color filters 12, 13 and 14 and are photo-electric converted by photo-electric converters 15, 16 and 17. As will be described later with reference to FIG. 2, the photo-electric converters 15, 16 and 17 accumulate electric charges by photo excitation and produce the electric charges as voltage signals, which are color component signals SR, SG and SB. Therefore, the color component signals SR, SG and SB are voltage signals which vary accordingly as the electric charges are accumulated.

A reset circuit 18 is arranged to be caused by a comparison end signal CE which comes from a comparison part 2 and a signal HS which is synchronized with the horizontal synchronizing signal of TV to generate a reset signal RS which has a constant pulse width. This reset signal RS is arranged to bring the photo-electric converters 15, 16 and 17 to their initial state by clearing the electric charges accumulated there.

A reading circuit 19 is arranged to receive emitter voltages SSR, SSG and SSB which come from the photo-electric converters 15, 16 and 17 and to produce a common reading signal RE when any one of these input signals reaches a given level.

Figure 2:
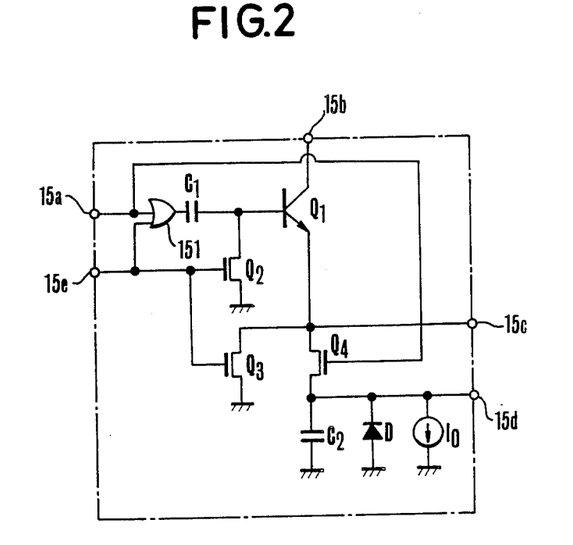
FIG. 2 is a circuit diagram showing by way of example the arrangement of a photo-electric converter shown in FIG. 1.

FIG. 2 shows in a circuit diagram an example of arrangement of the photo-electric converter 15. Other photo-electric converters 16 and 17 are also arranged in the same manner. Referring to FIG. 2, a capacitor C1 has one end thereof connected to an OR gate 151. The two input terminals of the OR gate 151 are connected to input terminals 15a and 15e of the converter. The other end of the capacitor C1 is connected to the base of a photo transistor Q1 and is grounded via an FET Q2. The input terminal 15a is arranged to receive the reading signal RE. The other input terminal 15e is arranged to receive the reset signal RS.

The photo transistor Q1 has its collector terminal connected to a power supply terminal 15b and its emitter terminal to an output terminal 15c which is provided for producing the signal SSR. The emitter terminal of the transistor Q1 is grounded via an FET Q3 and is further connected to one end of another capacitor C2 via an FET Q4. The capacitor C2 has one end thereof connected to an output terminal 15d and the other end grounded. To the capacitor C2 are parallel connected a diode D and a constant current source Io. The output terminal 15d is arranged to produce a color component signal which is electric charge accumulated at the capacitor C2. The gates of the FETs Q2 and Q3 are connected to a control terminal 15e which is arranged to receive the reset signal RS. The gate of the FET Q4 is connected to the control terminal 15a which is receiving the reading signal RE.

While each of the photo-electric converters 15, 16 and 17 is arranged as described above, the capacitor C2 is arranged as follows: The capacity of the capacitor C2 for the color component G is ½ of the capacity for other color components R and B. Further, the constant current Io may be singly provided for use in common by all the photo-electric converters 15, 16 and 17.

Again referring to FIG. 1, the comparison part 2 is arranged to compare the color component signals SR, SG and SB with reference voltages VR, VG and VB, respectively; and to detect lengths of time required before the color component signals SR, SG and SB which vary accordingly as the accumulated amounts of electric charges increase come to reach the given reference voltages VR, VG and VB respectively. The comparison part 2 includes a comparator 21 for a red color, a comparator 22 for a green color and a comparator 23 for a blue color. These comparators 21, 22 and 23 are arranged in the form of operational amplifiers. The color component signals SR, SG and SB are arranged to be supplied to the non-inverting terminal of the comparators 21, 22 and 23. To the inverting terminals of these comparators are supplied the reference voltages VR, VG and VB. The comparators 21, 22 and 23 produce comparison signals CR, CG and CB, which remain at a low level before the color component signals SR, SG and SB reach the reference voltages VR, VG and VB and at a high level after they reach the reference voltages.

The comparison part 2 further includes a NOR circuit 24, which is arranged to detect that all the color component signals SR, SG and SB have reached the reference voltages VR, VG and VB respectively. Upon detection of that, the NOR circuit 24 produces a comparison end signal CE and supplies it to the color component detecting part 1. In the case of this specific embodiment, the reference voltages VR, VG and VB are all set at 0 V.

The embodiment has an output part 3 for producing color temperature information about the color temperature of the incident light on the basis the comparison signals CR, CG and CB. As mentioned above, the comparison signal CR, CG and CB are obtained by converting the initial accumulated amounts of electric charges into lengths of time. Therefore, a signal of the color temperature information is obtained by comparing the lengths of time and by thus obtaing a ratio among them. In the case of this embodiment, the green color comparison signal CG is used as reference. The time ratio of the red color comparison signal CR and that of the blue color comparison signal CB to the signal CG are respectively obtained. Then, these ratios are converted into voltage signals by smoothing circuits 40 and 41. The voltage signals thus obtained are produced as a red voltage signal RC and a blue output signal BC respectively. The output part which is arranged in this manner comprises: A logic circuit which includes an inverter 31 and AND circuits 32 to 35; switches 36 and 37 which are arranged to select red output voltages ER1 and ER2 (ER2<ER1) according to the output of the logic circuit; switches 38 and 39 which are arranged to select blue output voltages EB1 and EB2 (EB2<EB1) according to the output of the logic circuit; and the above stated smoothing circuits 40 and 41 which are arranged to smoothen respectively the red output voltage and the blue output voltage selected.

The AND circuit 32 is arranged to obtain the logical product of the comparison signals CR and CG. The output of the AND circuit 32 serves as a control signal for the switch 36 which selects the output voltage ER1. The AND circuit 33 is arranged to obtain the logical product of the comparison signal CR and the inverted signal of the comparison signal CG. The output of the AND circuit 33 serves as a control signal for the switch 37 which selects the output voltage ER2. The red color output voltages ER1 and ER2 which are selected in a given time ratio by the switches 36 and 37 are smoothed by the smoothing circuit 40 and are produced as a red color output signal RC.

A blue color system is arranged likewise. The AND circuit 34 is arranged to obtain the logical product of the comparison signals CB and CG. The output of the AND circuit 34 thus obtained controls the switch 38 which selects the output voltage EB1. Meanwhile, the AND circuit 35 is arranged to obtain the logical product of the comparison signals CB and the inverted signal of the comparison signal CG. The output of the AND circuit 35 controls the switch 39 which is arranged to select the output voltage EB2. The blue color output voltages EG1 and EB2 which are selected in a given time ratio by the switches 38 and 39 are smoothed by the smoothing circuit 41 and are produced as a blue color output signal BC.

The embodiment is further provided with a color image sensor IS which is arranged to form an electrical signal according to the image of the incident light; variable gain amplifiers GRC and GBC; and a matrix encoder ME.

Figure 3A:
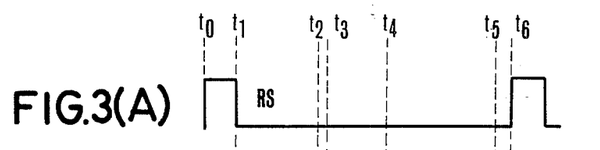
Figure 3B:
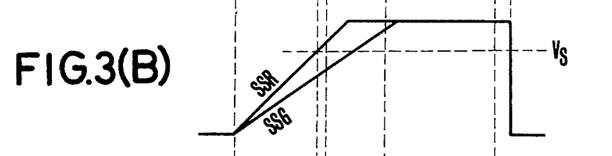
Figures 3C, 3D:
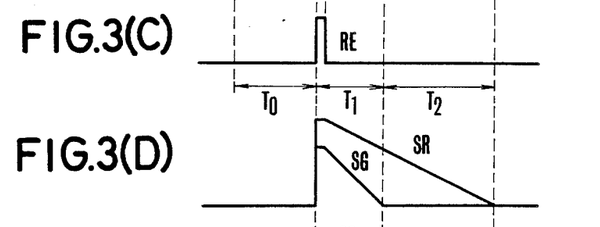
Figure 3E:
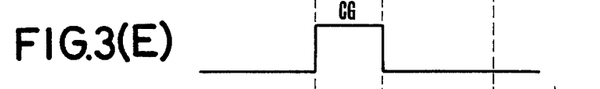
Figure 3F:
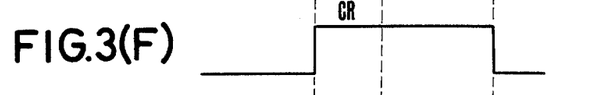

The embodiment which is arranged as described above operates as described below with reference to FIGS. 3(A) to 3(I) which are wave form charts:

While the red-color and green-color systems are described here, the blue-color system which is similar to the red and green systems is omitted from description. Referring to FIG. 3(A), a reset signal RS is generated at a point of time t0. The electric charge accumulated at the capacitor C1 of each of the photo-electric converters 15, 16 and 17 is discharged via the FETs Q2 and Q3 (a reset action). At another point of time t1: The reset state is canceled. Then, electric charge is accumulated and increases with the lapse of time at the capacitor C1 of each of the photo-electric converters 15 and 16. The electric charge is produced as an emitter voltage SSR via the photo .transistor Q1 from the output terminal 15c. If the color temperature of the incident light is low, this output becomes a signal which increases while retaining the emitter voltages SSR and SSG in a relation of SSG<SSR, as shown in FIG. 3(B), (an accumulating action). At a point of time t2: One of the emitter voltages SSR, SSG and SSB (SSR in this case) reaches a given reference voltage VS. Then, a reading signal RE is generated by the reading circuit 19, as shown in FIG. 3(C). This causes the FET Q4 of each of the photo-electric converters 15 and 16 to turn on and the potential of the capacitor C1 to increase. The accumulated electric charge is then transferred to the capacitor C2. The electric charge which is thus accumulated at the capacitor C2 is discharged at a given rate by means of the constant current source Io after a point of time t3. The discharged electric charge is produced from the output terminal 15d as a color component signal SR, as shown in FIG. 3(D). Meanwhile, other color component signals SG and SB are likewise produced. Immediately after this reading action, the output levels of the comparators 21 and 22 of the comparison part 2 changes from a low level to a high level, as shown in FIGS. 3(E) and 3(F).

At a point of time t4: The color component signal SG reaches a reference voltage VG. Then, the level of the comparison signal CG become low, as shown in FIG. 3(E). At a point of time t5: The color component signal SR reaches a reference voltage VR. The comparison signal CR also comes back to a low level, as shown in FIG. 3(F). Comparison signals CR and CG which are thus obtained are supplied to the output part 3.

Figure 3G:
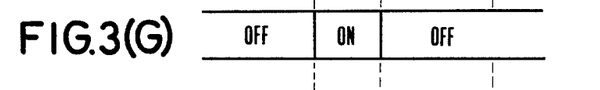
Figure 3H:
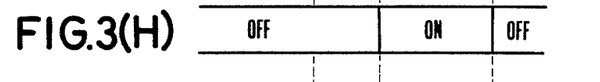

Assuming that a period from the time point t1 to t2 is a time T0, a period from the time t2 to time t4 a time T1 and another period from the time t4 to t5 a time T2, an AND condition is obtained for the AND circuit 32 during the period of time T1. As a result, the switch 36 turns on and the switch 37 turns off, as shown in FIGS. 3(G) and 3(H) and the output voltage ER1 is supplied to the smoothing circuit 40, as shown in FIG. 3(I).

Following this, during the time T2, an AND condition is obtained for the AND circuit 33. The switch 36 turns off and the switch 37 on, as shown in FIGS. 3(G) and 3(H). The output voltage ER2 is supplied to the smoothing circuit 40 as shown in FIG. 3(I). After the point of time t5, the AND conditions for the AND circuit 32 and 33 are no longer obtained. Both the switches 36 and 37 turn off, as shown in FIGS. 3(G) and 3(H). Therefore, the input of the smoothing circuit 40 comes to have a high impedance as shown in FIG. 3(I).

Figure 3I:
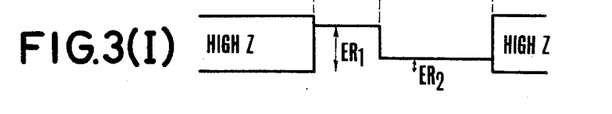

The smoothing circuit 40 thus receives the input signal which is as shown in FIG. 3(I). Since the smoothing circuit 40 is arranged to have a large time constant, upon receipt of a plurality of voltage signals of different levels, the circuit 40 produces an output at a mean value of the input voltages according to a supply time ratio between them. In the event of a high impedance state of the input, the smoothing circuit 40 retains its voltage state obtained immediately before the high impedance input. Therefore, the red color output signal RC is at a value between the voltages ER1 and ER2 according to the ratio between the period of time T1 and T2 during which the output voltages ER1 and ER2 are supplied. Detailed description of this relation is as follows: Assuming that the quantity of light incident on the photo-electric converter 15 is LR, that of light incident on the photo-electric converter 16 is LG, their conversion coefficients are AR and AG and their reading voltages are VSR and VSG, there obtain the following relations:

$$VSR = LR \cdot AR \cdot T0$$

$$VSG = LG \cdot AG \cdot T0$$

Accordingly, the length of time required before the signals SR and SG reach the reference voltages VR and VG (VR=VG=0 V) can be expressed as follows with the capacity of the capacitor C2 of the photo-electric converter 15 assumed to be CR and that of the capacitor C2 of the photo-electric converter 16 to be CG:

$$T1 = \frac{CG \cdot VSG}{Io}$$

$$T1 + T2 = \frac{CR \cdot VSR}{Io}$$

Since the red color output signal RC is at a mean value of the voltages ER1 and ER2 supplied to the smoothing circuit 40 during the periods of time T1 and T2, the value of the signal RC can be expressed as:

$$RC = \frac{T1 \cdot ER1 + T2 \cdot ER2}{T1 + T2}$$

$$= \frac{CG \cdot LG \cdot AG}{CR \cdot LR \cdot AR}(ER1 - ER2 + ER2)$$

Since CR=2 CG, the red color output signal can be further expressed by the following formula:

$$RC = K \frac{LG}{LR}(ER1 - ER2) + ER2 \quad (1)$$

wherein, $K = \frac{AG}{2AR}$

As apparent from Formula (1) above, the red color output signal RC varies between the voltages ER1 and ER2 according to a ratio between the R and G components of the incident light $\phi$. The value of the signal RC becomes closer to the voltage ER1 when the R component is smaller than the G component and becomes closer to the other voltage ER2 when the R component is larger than the G component. The gain of the red signal amplifier GRC of the red color system included in the outputs of the image sensor IS is controlled by this red color output signal RC. The blue color output signal BC likewise controls the gain of the blue signal amplifier GBC.

The outputs of the image sensor IS are supplied to a matrix encoder ME via the amplifiers GRC and GBC to be converted into a luminance signal and a color difference signal. The luminance signal and the color difference signal are then multiplexed and, for example, converted into a standard TV signal. When all the color component signals come to reach their corresponding reference voltages, there obtains a condition for the NOR circuit 24 of the comparison part 2. The rise of the comparison end signal CE is then supplied to the reset circuit 18. When a signal HS which is in synchronism with the horizontal synchronizing signal of the TV signal is applied at a point of time t6 to the reset circuit 18 under this condition, again the reset signal RS is generated. The photo-electric converters 15, 16 and 17 then discharge the electric charges of their capacitors C1 to resume their initial states. The same operation is repeated thereafter.

While the embodiment described is arranged to detect the red (R), green (G) and blue (B) components of the incident light, this arrangement may be changed to detect two or four or more than four color components.

As described in detail above, the color temperature detecting device according to this invention is arranged to detect the intensity of each color component of the incident light by obtaining a time length signal from a length of discharge time corresponding to the amount of electric charge excited and accumulated according to the quantity of the incident light and to produce the signal obtained on the basis of the length of time as the color temperature information. This arrangement enables the embodiment to detect the color temperature of the incident light of a wide illuminance range despite of its simple arrangement. With the arrangement of this embodiment applied to the outside-detection automatic follow-up type white balance adjustment device mentioned in the foregoing, therefore, white balance adjustment can be accurately carried out with simple arrangement. It is another advantage of the embodiment that the arrangement to detect the magnitude of each color component through the discharge length of time ensures a stable output of the smoothing circuit, because the period of time T1+T2 is almost constant and unvarying without being affected by variations in the intensity of the incident light.

If the comparators 21, 22 and 23 are arranged to compare the levels of emitter voltages SSR, SSG and SSB directly with the reference voltages VR, VG and VB, the comparison time at the comparators 21, 22 and 23 would fluctuate, for example, between 100 $\mu$sec and 100 msec according to variations in the intensity of the incident light. This would cause excessive variations in the response time of white balance adjustment according to the incident light intensity. Besides, matching with the time constant of the smoothing circuit would also come to deviate according to the incident light intensity and thus would result in an error. These problems are solved by the invented arrangement.

Figure 4:
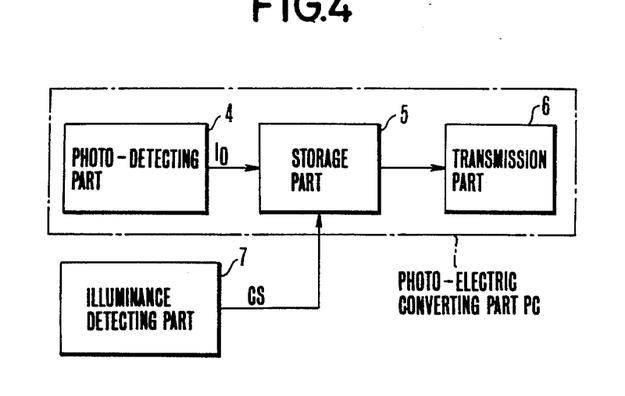
FIG. 4 is a block diagram showing in outline the arrangement of a second embodiment of this invention.

A second embodiment of this invention is arranged as follows: FIG. 4 is a block diagram showing in outline the arrangement of the second embodiment. In the case of the second embodiment, the photo-electric converting part PC includes a photo-detecting part 4 which is arranged to produce a current Io according to the quantity of light incident thereon; and a storage part 5 consisting of capacitors. The capacity of the storage part 5 is arranged to be changed from one value over to another according to a sensitivity selection change-over signal CS. The electric charge accumulated at the storage part 5 is arranged to be sent to the outside as a voltage signal from a transmission part 6. These parts 4, 5 and 6 jointly form the photo-electric converting part PC.

An illuminance detecting part 7 is arranged to generate the sensitivity change-over signal CS which controls the capacity of the storage part 5. By this, the sensitivity of the photo-electric converting part PC is changed from one value over to another.

Figure 5:
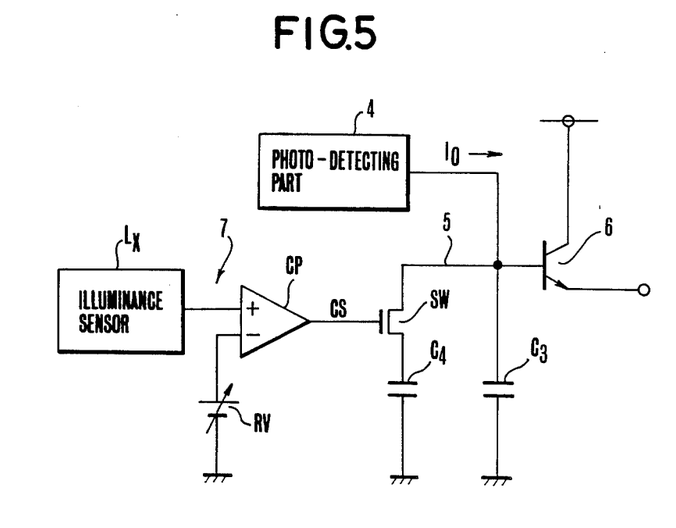
FIG. 5 is a circuit diagram showing the circuit arrangement of the second embodiment.

FIG. 5 is a circuit diagram showing the details of the block diagram of FIG. 4. The same parts as those of FIG. 4 are indicated with the same reference numerals. Referring to FIG. 5, the photo-detecting part 4 is a photo sensor which is arranged to produce a current Io according to the quantity of the incident light. The current Io is supplied to a capacitor C3 of the storage part 5. With the storage or accumulating time of the capacitor C3 assumed to be t, a voltage $E_{C3}$ between the plates of the capacitor C3 can be expressed as follows:

$$E_{C3} = \frac{Iot}{C3} \quad (2)$$

Formula (2) indicates that this voltage $E_{C3}$ is proportional to the current Io and the storage time t and is inversely proportional to the capacity C3 of the capacitor C3. The voltage $E_{C3}$ is sent out via an emitter-follower circuit of the transmission part 6.

Assuming that the operating range of the photo-electric converting part PC is from 10 to 100 thousand lux, it requires a dynamic range of about 80 dB. However, it has been impossible for the conventional photo sensor to have such a wide dynamic range. In view of this, it is conceivable to broaden the dynamic range through change-over of the sensitivity by changing the capacity C3 from one value over to another according to Formula (2).

Hence, a series circuit consisting of a switch element SW and a capacitor C4 is connected to the storage part 5 in parallel to the capacitor C3. The switch element SW performs a sensitivity switching function for the purpose of broadening the dynamic range. The switch element SW is arranged to be on-off controlled by the sensitivity change-over signal CS. With the switch element thus operated, the capacity of the storage part 5 is changed from the capacity C3 over to another capacity C3+C4 and vice versa.

The illuminance detecting part 7 is arranged to generate the sensitivity change-over signal CS. The part 7 includes an illuminance sensor LX and a comparator CP. When the intensity of the incident light detected by the illuminance sensor LX comes to exceed a reference voltage RV, the switch element SW turns on. Assuming that the sensitivity is shifted to 1/100 of its value at a illuminance value exceeding 1000 lux, the reference voltage RV is set at the output value of the illuminance sensor LX obtained at the illuminance value of 1000 lux. Then, the switch element SW is arranged to turn on when the illuminance comes to exceed 1000 lux. The capacity values of the capacitors C3 and C4 are arranged to be C3+C4=100 C3. Then, the voltage $E_{C3+C4}$ between plates of the parallel capacitors C3 and C4 can be expressed as follows:

$$E_{C3+C4} = \frac{Iot}{C3+C4} = \frac{Iot}{100C3} = \frac{E_{C3}}{100} \quad (3)$$

In other words, with the illuminance exceeding 1000 lux, the sensitivity of the device is reduced to 1/100 at the same value of signal current and the same length of storage time. Then, the dynamic range is broadened by 100 times (40 dB).

Therefore, in response to the change-over signal CS, the capacity of the storage part 5 is increased to lower the sensitivity of the photo-electric converting part when the illuminance of the incident light is high and is decreased to raise the sensitivity when the illuminance of the incident light is low. This arrangement thus enables the photo-electric converter to have a wider dynamic range. Further, the electric charge of the capacitors C3 and C4 are arranged to be discharged by means of the reset circuit arranged as shown in FIG. 2.

Figure 6:
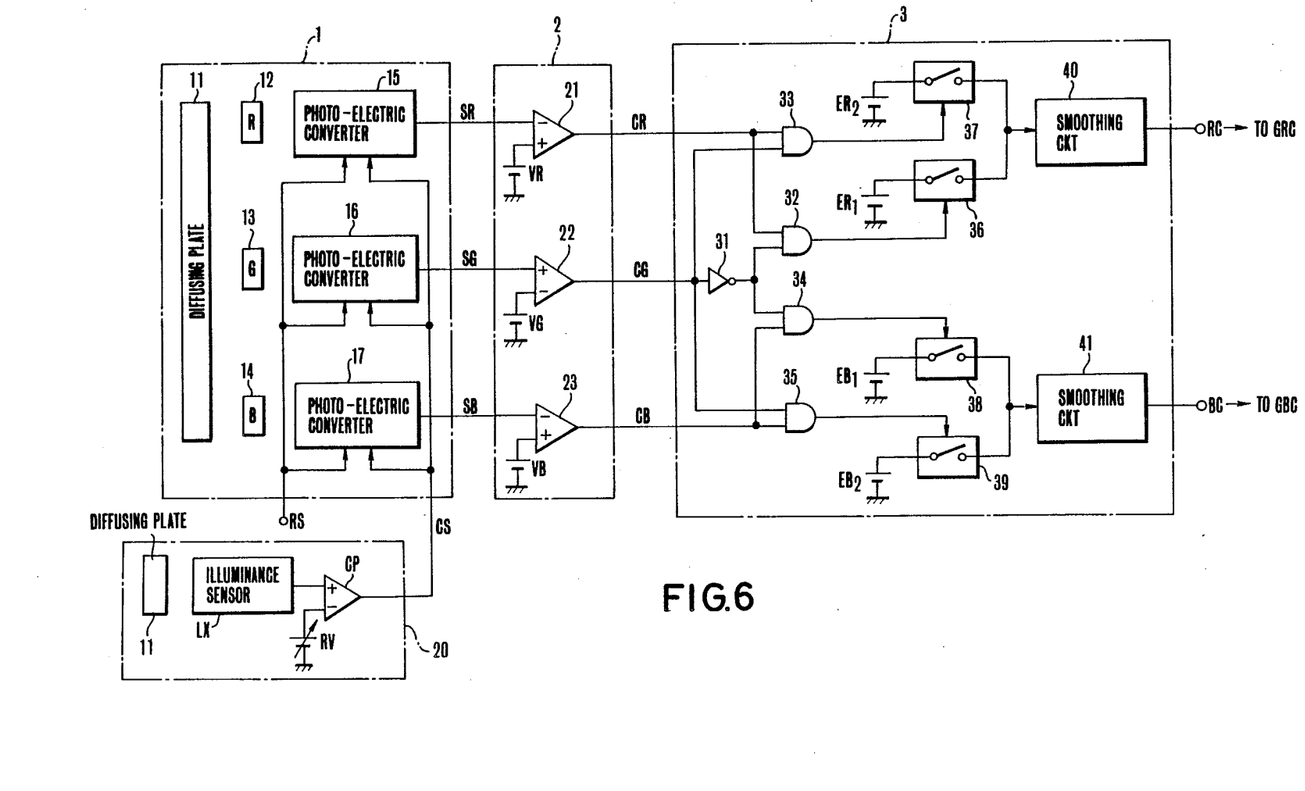
FIG. 6 is a circuit diagram showing a color temperature detecting device included in a white balance device to which this invention is applied.

Next, an application example wherein this invention is applied to an image sensing apparatus is described as follows: FIG. 6 is a circuit diagram showing a color temperature detecting device which is included in this apparatus. In FIG. 6, the same elements and parts as those shown in FIGS. 1 to 5 are indicated with the same reference numerals and symbols. This embodiment differs from the the first embodiment shown in FIG. 1 in that the sensitivity of the color component detecting part 1 is controlled by the illuminance detecting part 20.

The color component detection part 1 is provided with a diffusing plate 11 which is arranged to remove any biased or uneven state of color information by diffusing the incident light coming through a light receiving part provided separately from an image sensing system for detecting illumination on the object. The light passed through this diffusing plate 11 is applied to color filters 12, 13 and 14 for red (R), green (G) and blue (B). Color components are thus taken out from the light. These color components are photo-electric converted by photo-electric converters 15, 16 and 17.

These converters 15, 16 and 17 form the photo-electric converting part PC of this embodiment. As mentioned in the foregoing, they produce voltage signals in proportion to the current Io and the accumulating or storage time t. These voltage signals are produced as color component signals SR, SG and SB. Each of these photo-electric converters 15 to 17 is arranged to have the electric charge of the storage part 5 discharged by the reset signal which is synchronized with the horizontal synchronizing signal of TV and is reset into its initial state.

The illuminance detecting part 20 includes an illuminance sensor LX which is disposed behind the diffusing plate 11 and a comparator CP. The part 20 produces a sensitivity change-over signal CS when the intensity of the incident light comes to exceed a reference value RV. The embodiment includes a comparison part 2. The comparison part 2 is arranged to compare the color component signals SR, SG and SB with reference voltages VR, VG and VB; and to detect a length of time lapsed before the color component signals SR, SG and SB respectively come to reach their reference voltages VR, VG and VB. The comparison part 2 includes a comparator 21 which is for the red color, a comparator 22 which is for the green color and a comparator 23 which is for the blue color. These comparators are composed of operational amplifiers. Unlike the first embodiment shown in FIG. 1, the color component signals SR and SB are supplied to the inverting terminals of the comparators 21 and 23 while the reference voltages VR and VB are supplied to their non-inverting terminals. Meanwhile, the comparator 22 is arranged to have the reference voltage VG supplied to the inverting terminal thereof and the color component signal SG to the non-inverting terminal thereof. Therefore, the comparators 21 and 23 produce comparison signals CR and CB at a high level before the color component signals SR and SB reach the reference voltages VR and VB and at a low level after they reach the reference voltages. The comparator 22 produces another comparison signal CG at a low level before the color component signal SG reaches the reference voltage VG and at a high level after the color component signal SG reaches the reference voltage VG.

The output part 3 of the embodiment is arranged to obtain ratios among color components of the incident light on the basis of the comparison signals CR, CG and CB and to produce a red color output signal RC which represents a ratio of the red component to the green component and a blue color output signal BC which represents a ratio of the blue component to the green component. The output part 3 includes a logic circuit consisting of an inverter 31 and AND circuits 32 to 35; switches 36 and 37 which are arranged to select the red color output voltages ER1 and ER2 (ER1<ER2) according to the output of the logic circuit; switches 38 and 39 which are arranged to select the blue color output voltages EB1 and EB2 (EB1<EB2) according to the output of the logic circuit; and smoothing circuits 40 and 41 which are arranged to smooth the red color output voltage and blue color output voltage selected.

The AND circuit 32 is arranged to obtain a logical product from the comparison signal CR and a signal obtained by inverting the comparison signal CG through the inverter 31. The output of the AND circuit 32 is used as a control signal for the switch 36 which is arranged to select the output voltage ER1. The AND circuit 33 is arranged to obtain a logical product from the comparison signals CR and CG and to produce a control signal for the switch 37 which is arranged to select the output voltage ER2. The red color output voltage ER1 or ER2 selected by the switch 36 or 37 is smoothed by the smoothing circuit 40 and is produced as a red color output signal RC.

The blue color system is arranged likewise. The AND circuit 34 is arranged to obtain a logical product from the comparison signal CB and a signal obtained by inverting the comparison signal CG and to produce and supply a control signal to the switch 38 which is arranged to select the output voltage EB1. The AND circuit 35 is arranged to obtain a logical product from the comparison signals CB and CG and to control with its output the switch 39 which is arranged to select the output voltage EB2. The blue color output voltage EB1 or EB2 which is selected by the switch 38 or 39 is smoothed by a smoothing circuit 41 and is produced as a blue output signal BC.

Figures 7A, 7K:
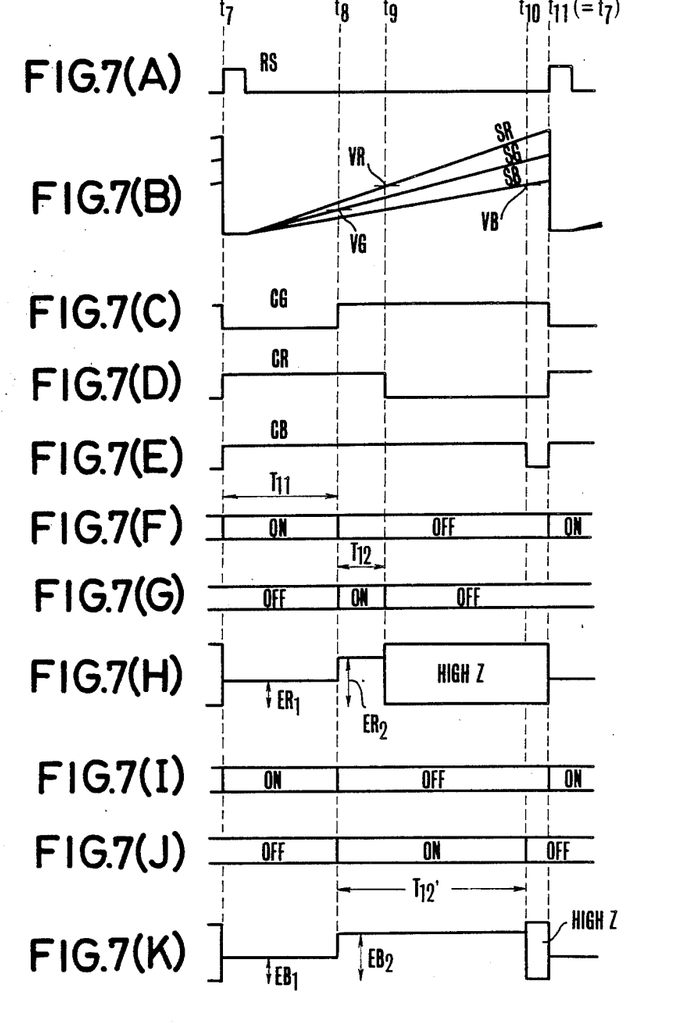

The color temperature detecting device of this embodiment is arranged as described above. This device operates as described below with reference to FIGS. 7(A) to 7(K) which are wave form charts:

When the reset signal RS is generated at a point of time t7, as shown in FIG. 7(A), the photo-electric converters 15 to 17 are initialized. After the initialization, the photo-electric converters 15, 16 and 17 come to produce the color component signals SR, SG and SB according to the intensity of the color components of the incident light. If the color temperature of the incident light is low, the color component signals are in a relation of SB<SG<SR and increase their levels with the lapse of time while retaining this relation, as shown in FIG. 7(B). At a point of time t8: The color component signal SG comes to exceed the reference voltage VG. Therefore, the level of the comparison signal CG of the comparator 22 changes from a low level to a high level, as shown in FIG. 7(C). The reference voltage VG is arranged to be VR=VB=½VG.

At time points t9 and t10: The color component signals SR and SB respectively come to exceed the reference voltages VR and VB (VR=VB). As a result, the levels of the comparison signals CR and CB change from a high level to a low level respectively, as shown in FIGS. 7(D) and 7(E). The comparison signal which are thus obtained are supplied to the output part 3. Then, the red color output signal RC and the blue color output signal BC are formed respectively according to the ratio of the comparison signal CR to the comparison signal CG and the ratio of the signal CB to the signal CG.

The operation of the red color system circuits included in the output part 3 is as follows: Assuming that a period from the point of time t7 to the point of time t8 is a period of time T11 and a period from the time point t8 to the time point t9 is a period of time T12, an AND condition for the AND circuit 32 is obtained during the time T11. Then, the switch 36 turns on, as shown in FIG. 7(F) to allow the output voltage ER1 to be supplied to the smoothing circuit 40, as shown in FIG. 7(H). Following this, during the time T12, an AND condition is obtained for the AND circuit 33 to turn on the switch 37, as shown in FIG. 7(G). This allows the output voltage ER2 to be supplied to the smoothing circuit 40, as shown in FIG. 7(H). After the time point t8, the AND conditions are no longer obtained for the AND circuits 32 and 33. The switches 36 and 37 both turn off, as shown in FIGS. 7(F) and 7(G). As a result, the input to the smoothing circuit 40 assumes a high impedance state HIGH Z, as shown in FIG. 7(H). The smoothing circuit 40 thus receives the signal which is as shown in FIG. 7(H).

Therefore, the red color output signal RC comes to be of a value between the voltages ER1 and ER2 according to the periods of time T11 and T12 during which the output voltages ER1 and ER2 are supplied. The detailed description of this relation is as follows: Assuming that the quantity of light incident on the photo-electric converter 15 is LR, that of light incident on the photo-electric converter 16 is LG and their conversion coefficients are AR and AG respectively, the color component signals SR and SG can be expressed as the functions of time t in the following manner:

$$SR = LR \cdot AR \cdot t$$

$$SG = LG \cdot AG \cdot t$$

Therefore, the length of time required before the signals SR and SG reach the reference voltages VR and VG can be expressed as follows:

$$T11 + T12 = \frac{VR}{LR \cdot AR}$$

$$T11 = \frac{VG}{LG \cdot AG}$$

Since the red color output signal RC is a mean value of the voltages ER1 and ER2 supplied to the smoothing circuit 40 during the periods of time T11 and T12, the signal RC can be expressed as follows:

$$RC = \frac{T11 \cdot ER1 + T12 \cdot ER2}{T11 + T12} \quad (4)$$

$$= ER2 - \frac{T11}{T11 + T12}(ER2 - ER1)$$

$$= ER2 - K\frac{LR}{LG}(ER2 - ER1)$$

wherein $K = \frac{VG \cdot AR}{VR \cdot AG}$

As apparent from Formula (4), the red color output signal RC varies between the voltages ER1 and ER2 according to the ratio between the R and G components of the incident light. The value of the signal RC comes closer to the voltage ER2 when the R component is small compared with the G component and comes closer to the other voltage ER1 when the R component is large as compared with the G component.

While the operation of the red color system circuits is as described above, the blue color system circuits operate likewise and, therefore, details of their operation is omitted from the following description. However, in the blue color system, the output voltage EB1 is supplied to the smoothing circuit 41 during the period of time T11 and the output voltage EB2 is supplied during the period of time T12' (time point t8–t10), as shown in FIG. 7(K).

At a point of time t10: With all the color component signals in their states of having exceeded their corresponding reference voltages, when the reset signal which is synchronized with the horizontal synchronizing signal of TV is applied to the photo-electric converting part, the photo-electric converters 15, 16 and 17 come back to their initial states and, after that, the same operation as described in the foregoing is repeated.

The photo-electric converting device which is arranged as the second embodiment of this invention as described in the foregoing is capable of accurately performing a photo-electric converting operation on incident light of wide illuminance range, because of the arrangement to make the capacitor of the storage part smaller for light of a low intensity and larger for light of a high intensity by changing the capacity of the electric charge storage part from one value over to another according to the illuminance of the incident light. With the embodiment applied, for example, to the light receiving system of an automatic peripheral follow-up type white balance device, the embodiment enables it to accurately adjust the white balance with a wide dynamic range.

Figure 8:
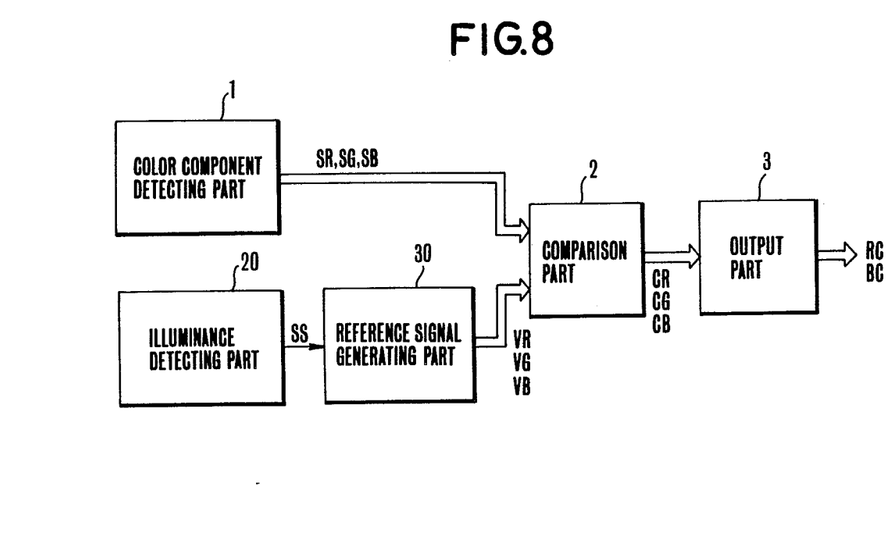
FIG. 8 is a block diagram showing another embodiment of this invention.

FIG. 8 is a block diagram showing the basic arrangement of a color temperature detecting device arranged according to this invention as a third embodiment thereof. Referring to FIG. 8, the third embodiment is arranged as follows: An illuminance detecting part 20 is arranged to detect the illuminance of the incident light and to generate a switching signal SS when the intensity of the light becomes lower than a given value. A reference signal generating part 30 is controlled by the switching signal SS.

The reference signal generating part 30 is arranged to supply a comparison part 2 with reference voltages VR, VG and VB for the purpose of detecting the levels of color component signals SR, SG and SB. The reference voltage level is arranged to be selectively variable from one level over to another in accordance with the switching signal SS. The comparison part 2 is arranged to receive the reference voltages VR, VG and VB at levels apposite to the illuminance of the ambient light of the object.

Such being the arrangement, the reference voltages are increased when the incident light is strong and are lowered when the incident light is weak. The color temperature of the incident light thus can be detected within a given period of time irrespectively of the degree of intensity of the incident light. The arrangement of the third embodiment thus gives a color temperature detecting device of a wide dynamic range.

Figure 9:
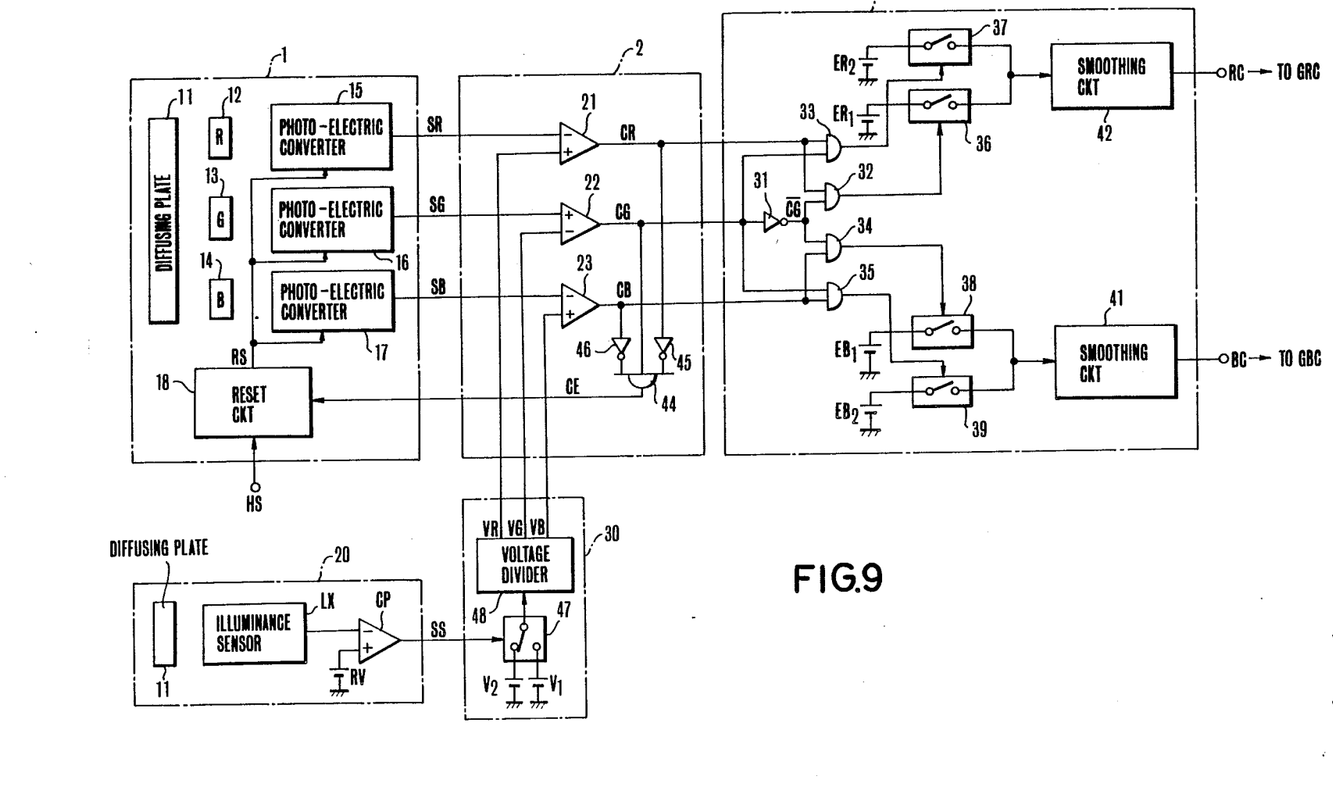
FIG. 9 is a circuit diagram showing the circuit arrangement of an embodiment of this invention.

Referring now to FIG. 9 which is a circuit diagram, the details of the block diagram of FIG. 8 are as follows: In FIG. 9, the same components and parts as those of FIGS. 1 to 8 are indicated with the same reference numerals and symbols. The illuminance detecting part 20 includes an illuminance sensor LX which is disposed behind a diffusing plate 11 and a comparator CP. The illuminance sensor LX is arranged to detect the intensity of the incident light. When the intensity of the incident light becomes lower than a reference value RV, a switching signal SS is produced.

The reference signal generating part 30 is arranged to produce the reference voltages VR, VG and VB according to the illuminance of the incident light under the control of the switching signal SS. In the part 30, a switch 47 is arranged to select one of voltages V1 and V2 (V1<V2). A voltage divider 48 which consists of a resistance voltage dividing circuit, etc. is arranged to divide the selected voltage V1 or V2 and to produce the reference voltages VR, VG and VB for red (R), green (G) and blue (B). In this case, the reference voltages are set in a relation of VR=VB=½VG.

An AND circuit 44 is arranged to supply a comparison end signal CE to the color component detecting part 1 when all the color component signals SR, SG and SB have reached their corresponding reference voltages VR, VG and VB. The AND circuit 44 operates to obtain the logical product from a signal obtained with a comparison signal CR inverted by an inverter 45, a comparison signal CG and a signal obtained with a comparison signal CG inverted by an inverter 46.

Therefore, an AND condition is established for the AND circuit 44 of the comparison part 2 when all the color component signals come to exceed the corresponding reference voltages. Then, the comparison end signal CE is supplied to a reset circuit 18. When a signal HS which is synchronized with the horizontal synchronizing signal of TV is applied to the reset circuit 18 under this condition, a reset signal RS is generated to bring the photo-electric converters 15, 16 and 17 back to their initial states. Then, if the output of the illuminance sensor becomes lower than the reference value RV as a result of a drop in the illuminance of the incident light under that condition, the illuminance detecting part 20 generates the switching signal SS. The signal SS then causes the switch 47 to shift the selection of the voltage V2 to the selection of the other voltage V1 (V1<V2). As a result, the reference signal generating part 30 comes to produce the reference voltages VR, VG and VB at low levels. As apparent from Formula (4) shown in the foregoing, this change in the levels of the reference voltages does not bring about any change in the output of the device so long as the ratio among these reference voltages remains unchanged.

Therefore, the processing time required by the comparison part 2 and the output part 3 does not become longer with the reference voltages lowered even in the event of a drop in the illuminance of the incident light. This enables the device to be capable of detecting the color temperature of the incident light in a cycle which is almost unvarying irrespectively of the illuminance of the incident light, so that accurate signals can be obtained from the smoothing circuits.

The arrangement and the operation of the third embodiment are as described above.

Figure 10A:
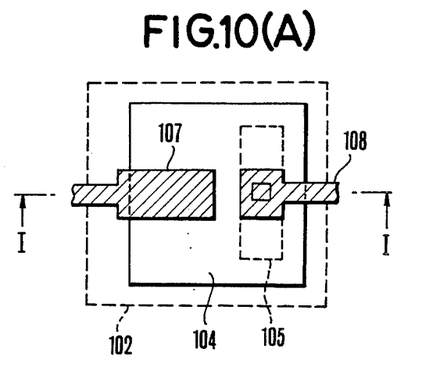
FIG. 10(A) is a schematic plan view of the converter.
Figure 10B:
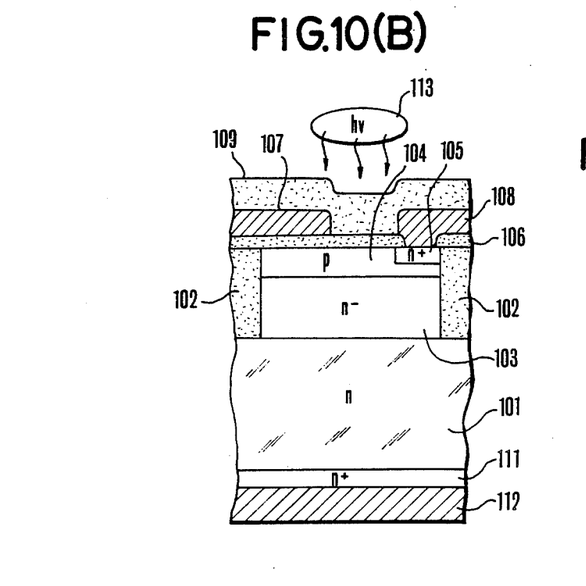
FIG. 10(B) is a sectional view taken along line I—I of FIG. 10(A)
Figure 10C:
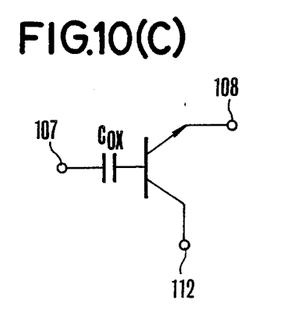
FIG. 10(C) shows an equivalent circuit of the converter.

Next, referring to FIGS. 10(A) to 10(C), a modification example of the photo-electric converter of FIG. 9 is described as follows: FIG. 10(A) is a plan view showing in outline the arrangement of the photo-electric converter. FIG. 10(B) is a sectional view taken along a line I—I of FIG. 10(A). FIG. 10(C) is an equivalent circuit diagram of the photo-electric converter. Referring to FIGS. 10(A) and 10(B), the photo sensor is formed on an n silicon substrate 101 and is electrically separated from the substrate 101 by means of an element separating area 102.

The photo sensor comprises a bipolar transistor which consists of an n⁻collector area 103, a p base area 104 and an n+emitter area 105; and a capacitor electrode 107 which is arranged to control the potential of the p base area 104 across an oxide film 106. The sensor further includes an emitter electrode 108; a protection film 109; an n+ area 111 for ohmic contact; and a collector electrode 112.

The basic operation of the photo sensor is as follows: The p base area 104 which is biased to an initial potential is first brought into a floating state. Then, of an electron-hall pair which results from photo excitation, the hall is accumulated in the p base area 104 (an accumulating action). Following this, a voltage between the emitter and the base is biased by applying a positive voltage to the capacitor electrode 107 to read out an accumulated voltage generated by the accumulated hall toward the floating emitter (a reading action). After that, the emitter is grounded. A reset pulse of a positive voltage is applied to the capacitor electrode 107 to raise the potential of the p base area 104. This causes a current to flow from the collector to the emitter. As a result, the hall accumulated at the p base area 104 disappears. When the refreshing positive voltage pulse comes to fall, the p base area 104 comes back to its initial state (a refreshing action).

The basic arrangement of the photo sensor is known, for example, from Japanese Patent Application Laid-Open No. SHO 60-12759, etc.

Figure 11:
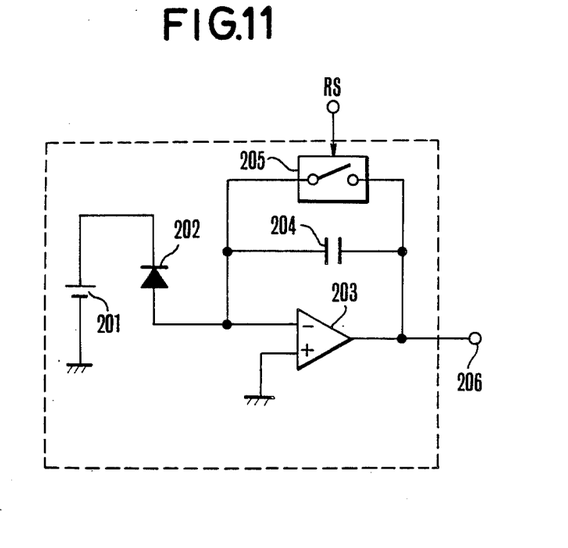
FIG. 11 is a circuit diagram showing a further example of arrangement of the photo-electric converter.

FIG. 11 shows a further example of a photo-electric converter to which this invention is applicable. The illustration includes a by-pass power supply 201; a photo diode 202; an operational amplifier 203; an integrating capacitor 204; a reset switch 205. When the reset signal RS comes to &he reset switch 205, the switch closes. This short-circuits the terminal voltage of the integrating capacitor 204 and discharge takes place. Upon termination of the reset signal RS, the reset switch 205 opens. A photo current corresponding to the light incident on the photo diode 202 flows from the by-pass power supply 201 via the photo diode 202 to be accumulated at the integrating capacitor 204. Then, a color component signal is produced from an output terminal 206.

The color temperature detecting device which is described above as an embodiment of the invention is arranged to compare the levels of a plurality of color components included in the incident light with reference levels which vary according to the illuminance of the incident light. Each of the reference levels is set at a low level when the illuminance of the indicant light is low and at a high level when the latter is high. This arrangement enables the embodiment to accurately detect the color temperature of the incident light for a wide range of illuminance.

Therefore, when applied, for example, to a white balance adjustment device of a so-called outside-detection automatic follow-up white balance type, the invention enables the white balance adjustment device to accurately accomplish white balance adjustment with a wide dynamic range.

What is claimed is:

1. A color temperature detecting device comprising:
   (a) color component detecting means for detecting electric charges for color components excited by incident light and accumulated with the lapse of time to produce color component signals;
   (b) comparison means for comparing the color component signals with respective given reference signals to produce discharge time length signals which correspond to the respective accumulated amounts of the electrical charges, said comparison means including: hold means for holding each of said color component signals; discharge means for discharging each of said color component signals held by said hold means; and a comparator for comparing outputs of said hold means with respective predetermined reference levels; and
   (c) an output part for obtaining a ratio between the color components on the basis of the discharge time length signals produced from said comparison means to produce as color temperature information a signal according to said ratio.

2. A device according to claim 1, wherein said color component detecting means has an amplifying function.

3. A device according to claim 1, wherein said output means includes a plurality of voltage sources which are selectively changed over according to said discharge time length signals representing said color component signals.

4. A device according to claim 4, wherein said output means further includes smoothing means for smoothing selected outputs of said plurality of voltage sources.

5. A color image sensing apparatus comprising:
   (a) color image sensing means for converting an optical image into a plurality of electrical color signals;
   (b) color component detecting means for detecting electric charges for color components excited by incident light and accumulated with the lapse of time to produce color component signals;
   (c) comparison means for comparing the color component signals with respective given reference signals to produce discharge time length signals which correspond to the respective accumulated amounts of the electrical charges, said comparison means including: hold means for holding each of said color component signals; discharge means for discharging each of said color component signals held by said hold means; and a comparator for comparing outputs of said hold means with respective predetermined reference levels;

(d) an output part for obtaining a ratio between the color components on the basis of the discharge time length signals produced from said comparison means to produce as color temperature information a signal according to said ratio; and (e) control means for controlling the balance of said plurality of electrical color signals relative to each other according to an output signal of said output means.

6. An apparatus according to claim 5, wherein said output means includes a plurality of voltage sources which are selectively changed over according to said discharge time length signals representing said color component signals.

7. An apparatus according to claim 6, wherein said output means further includes smoothly means for smoothing selected outputs of said plurality of voltage sources.

* * * * *